US012425761B2

(12) United States Patent
Chen et al.

(10) Patent No.: US 12,425,761 B2
(45) Date of Patent: Sep. 23, 2025

(54) EARPHONE

(71) Applicant: SHENZHEN CANNICE TECHNOLOGY CO., LTD., Shenzhen (CN)

(72) Inventors: Ke Chen, Shenzhen (CN); En Xie, Shenzhen (CN); Xiaoting Guo, Shenzhen (CN); Yunfeng Zhang, Shenzhen (CN)

(73) Assignee: SHENZHEN CANNICE TECHNOLOGY CO., LTD., Shenzhen (CN)

( * ) Notice: Subject to any disclaimer, the term of this patent is extended or adjusted under 35 U.S.C. 154(b) by 291 days.

(21) Appl. No.: 18/208,617

(22) Filed: Jun. 12, 2023

(65) Prior Publication Data

US 2024/0048889 A1 Feb. 8, 2024

(30) Foreign Application Priority Data

Aug. 4, 2022 (CN) ......................... 202222042858.7

(51) Int. Cl.
*H04R 1/10* (2006.01)

(52) U.S. Cl.
CPC ........... *H04R 1/105* (2013.01); *H04R 1/1016* (2013.01)

(58) Field of Classification Search
CPC .... H04R 1/105; H04R 1/1016; H04R 1/1058; H04R 1/1066
See application file for complete search history.

(56) References Cited

PUBLICATIONS

Translation of CN 114189778 A (Year: 2022).*

* cited by examiner

*Primary Examiner* — Brian Ensey
(74) *Attorney, Agent, or Firm* — Maschoff Brennan

(57) ABSTRACT

An earphone includes a housing provided with an accommodating groove and an opening groove. The opening groove connects the accommodating groove and the outside of the housing. A first hole is formed in the groove bottom of the accommodating groove. The earphone further includes an ear hanger, wherein one end of the ear hanger is provided with a rotating part inserted into the accommodating groove through the opening groove. The rotating part is provided with a second hole, a rotating shaft passes through the second hole and inserted into the first hole. The housing and the rotating part are rotatably connected around the rotating shaft. The earphone can effectively solve the problem that the rotating shaft of an existing ear-hanging earphone is prone to radial deflection, and is beneficial to enhancing the use hand feeling of a user.

10 Claims, 10 Drawing Sheets

EARPHONE

CROSS-REFERENCE TO RELATED APPLICATIONS

This application claims priority to Chinese Patent Application No. 202222042858.7, filed on Aug. 4, 2022, entitled "Earphone", which is incorporated herein by reference in its entirety.

FIELD OF THE TECHNOLOGY

The present This utility relates to the technical field of earphone equipment, in particular to an earphone.

BACKGROUND

Referring to FIG. 1, an existing ear-hanging earphone includes a housing 1, an ear hanger 2 and a rotating shaft, the rotating shaft is movably disposed in the housing 1, one end of the ear hanger 2 is in an annular structure and inserted into the housing 1, and the annular structure is sleeved on the rotating shaft and is rotatably connected to the housing 1 around the rotating shaft.

When using the ear-hanging earphones, the wearer hangs the ear hanger 2 on the human ears, the housing 1 can rotate around the rotating shafts relative to the ear hanger 2, and the angle between the ear hanger 2 and the housing 1 is adjusted in the front-rear direction of the ears. Therefore, the wearer can rotate the housing 1 to the most suitable position, the comfort and degree of fit of the wearer are improved, the wearer is convenient to wear, and the use experience of the wearer is improved.

In the existing ear-hanging earphone, the rotating shaft is a relatively independent component and is not firmly mounted on the housing 1, so that when the wearer rotates the housing 1 relative to the ear hanger 2 around the rotating shaft, the rotating shaft can be radially offset, and the adjusting hand feeling is greatly reduced.

Therefore, it is necessary to improve the existing ear-hanging earphone to solve the problem that the rotating shaft thereof is prone to radial deflection.

The above information disclosed in this Background section is included only to enhance the understanding of the context of this utility, and thus may include information that does not form prior art that is currently known to one of ordinary skill in the art.

SUMMARY

An object of this utility is to provide an earphone, which can effectively solve the problem that the rotating shaft of the existing ear-hanging earphone is prone to radial deflection, and enhance the use feeling of the user.

To achieve the above objectives, this utility provides an earphone, comprising:

a housing provided with an accommodating groove and an opening groove, the opening groove connects the accommodating groove and the outside of the housing, and a first hole is formed in the groove bottom of the accommodating groove;

an ear hanger, wherein one end of the ear hanger is provided with a rotating part inserted into the accommodating groove through the opening groove, and the rotating part is provided with a second hole;

a rotating shaft passes through the second hole and inserted into the first hole, and the housing and the rotating part are rotatably connected around the rotating shaft.

Optionally, the groove bottom of the accommodating groove protrudes with a positioning post toward the rotating part;

the rotating part is provided with an avoiding groove inserted transversely to avoid the positioning post, and the avoiding groove extends from the edge position of the rotating part to the second hole of the rotating part in the radial direction of the rotating part.

Optionally, an isolation middle shell is arranged on a side of the rotating part away from the positioning post;

a storage groove is provided on a side of the isolation middle shell away from the rotating part.

Optionally, the isolation middle shell and the rotating shaft are of an integrated structure.

Optionally, a groove depth of the avoiding groove is smaller than a thickness dimension of the rotating part.

Optionally, a through groove penetrating through the groove bottom of the avoiding groove is formed in the intermediate position of the avoiding groove;

the through groove extends from the second hole to an edge.

Optionally, the rotating part further comprises a through groove extending from the second hole to the edge, and the through groove and the avoiding groove at least partially do not overlap.

Optionally, a clamping assembly is provided between the housing and the rotating part.

Optionally, the clamping assembly comprises an elastic member and a plurality of positioning clamping grooves; wherein each positioning clamping groove is located in a groove wall of the accommodating groove;

the elastic member is mounted on the side wall of the rotating part and is used for abutting against the positioning clamping groove.

Optionally, the elastic member includes a glass bead spring.

This utility has the beneficial effects that: providing an earphone which inserts and fixes the rotating shaft in the first hole of the housing, so that when the housing and the rotating part rotate relative to the rotating shaft, the rotating shaft does not radially offset, and the use feeling of the user is enhanced.

BRIEF DESCRIPTION OF THE DRAWINGS

In order to more clearly illustrate the technical solutions in this utility or the prior art, the drawings needed in the embodiments or the prior art will be briefly introduced below, and obviously, the drawings in the following description are only some embodiments of this utility, and those skilled in the art can obtain other drawings according to these drawings without creative labor.

In the figure.

Figure 1:
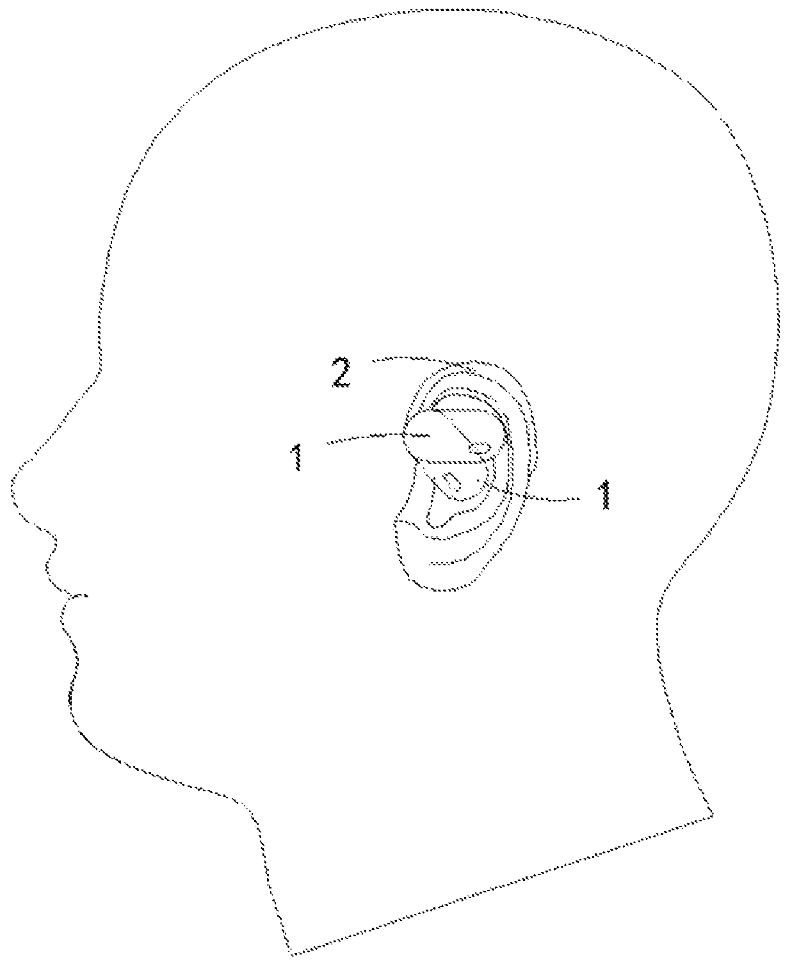
FIG. 1 is a schematic diagram of a position adjustment of a housing of an existing ear-hanging earphone according to the background technology.
Figure 2:
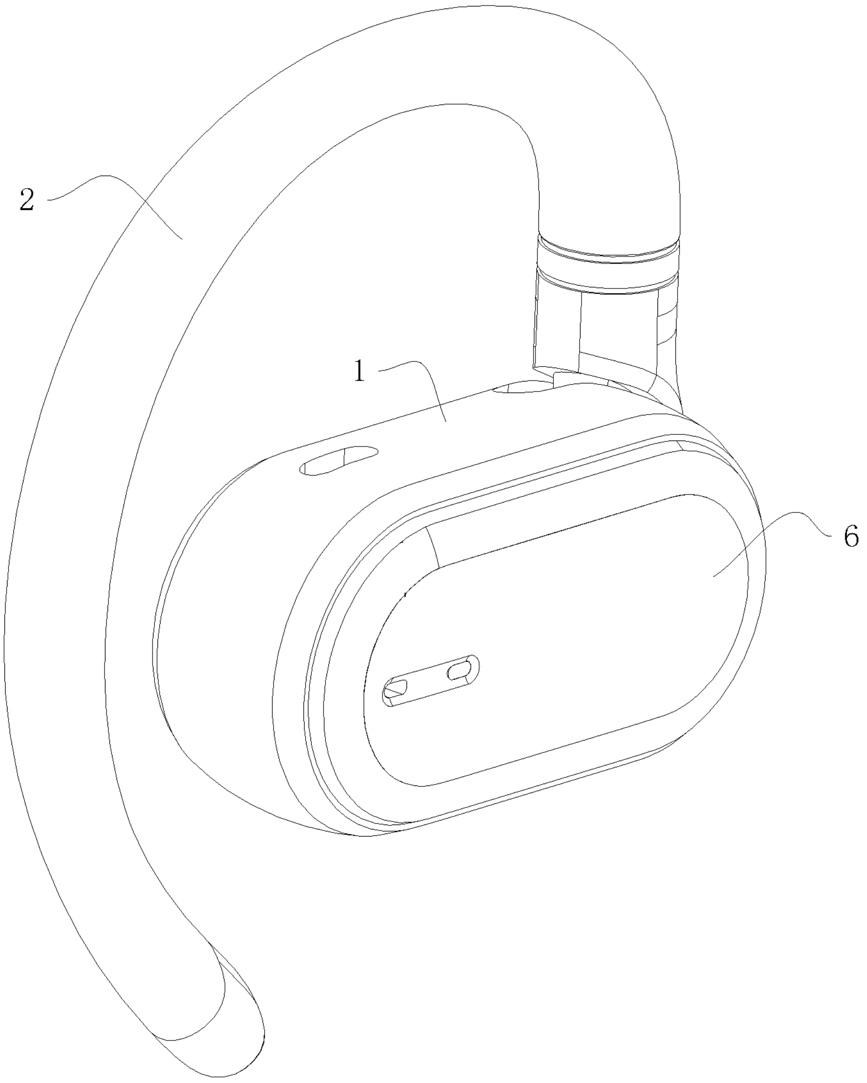
FIG. 2 is a schematic diagram of an outer side of an earphone according to an embodiment.
Figure 3:
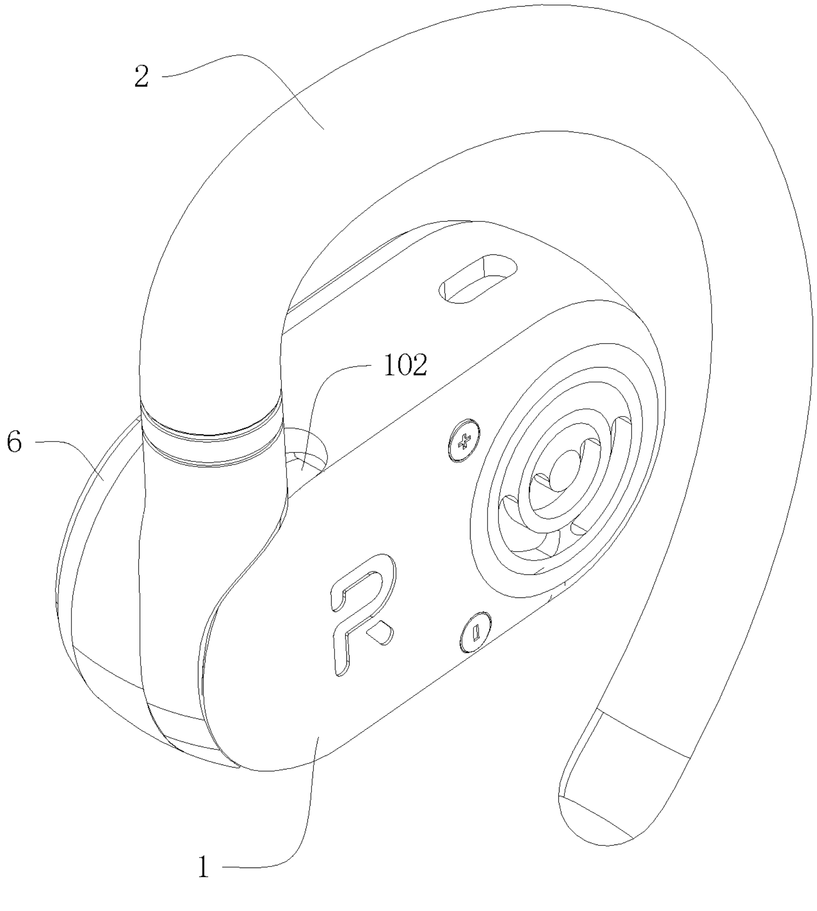
FIG. 3 is a schematic diagram of an inner side of an earphone according to an embodiment.
Figure 4:
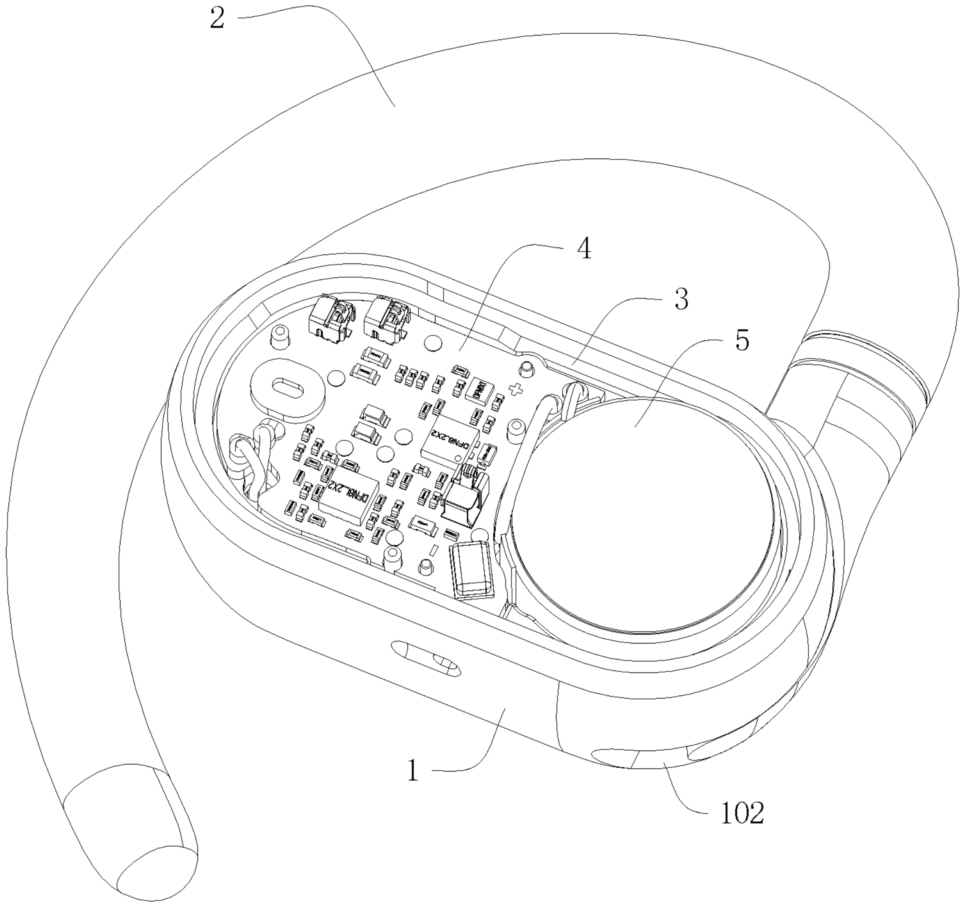
FIG. 4 is a schematic diagram of an earphone according to an embodiment after the end cap is hidden.

1, housing; 101, accommodating groove; 1011, positioning clamping groove; 102, open groove; 103, assembling groove; 104, positioning post; 1041, first hole;

2, ear hanger; 201, annular rotating body; 202, rotating part; 2021, second hole; 2022, avoiding groove; 2023, through groove;

3, isolation middle shell; 301, rotating shaft; 302, storage groove;

4, circuit board;

5, electronic device;

6, end cap;

7, elastic member;

8, sensor.

DETAILED DESCRIPTION

In order to make the objects, features and advantages of this utility more obvious and easy to understand, the technical solutions in the embodiments of this utility will be clearly and completely described below with reference to the accompanying drawings in the embodiments of this utility, and obviously, the embodiments described below are merely a part of the embodiments of this utility rather than all of the embodiments. Based on the embodiments of this utility, all other embodiments obtained by those of ordinary skill in the art without creative efforts shall fall within the scope of this utility.

In the description of this utility, it should be understood that when one component is considered to be "connected" to another component, it may be directly connected to another component or there may be a centrally disposed component at the same time. When one component is considered to be "disposed on" another component, it may be disposed directly on the other component or there may be a centrally disposed component at the same time.

In addition, the terms "long", "short", "inner", "outer" and the like indicate that the orientation or positional relationship is based on the orientation or positional relationship shown in the drawings, and is merely for the convenience of describing this utility, rather than indicating or implying that the device or element referred to must have the specific orientation and be operated in a specific orientation, which cannot be understood as a limitation of this utility.

This utility will be described in detail below with reference to specific embodiments shown in the accompanying drawings. However, these embodiments do not limit this utility, and the structures, methods, or functions performed by those skilled in the art according to these embodiments are all included in the protection scope of this utility.

This utility provides an earphone, which is suitable for the application scene of sound playing, and can effectively solve the problem that the rotating shaft of the existing ear-hanging earphone is prone to radial deviation, so as to enhance the rotation feeling of the user. It should be noted that the earphone may be a music earphone, or may be an auxiliary earphone.

Referring to FIG. 2 to FIG. 10, the earphone includes a housing 1, an ear hanger 2, an isolation middle shell 3, a circuit board 4, an electronic device 5, and an end cap 6.

Figure 5:
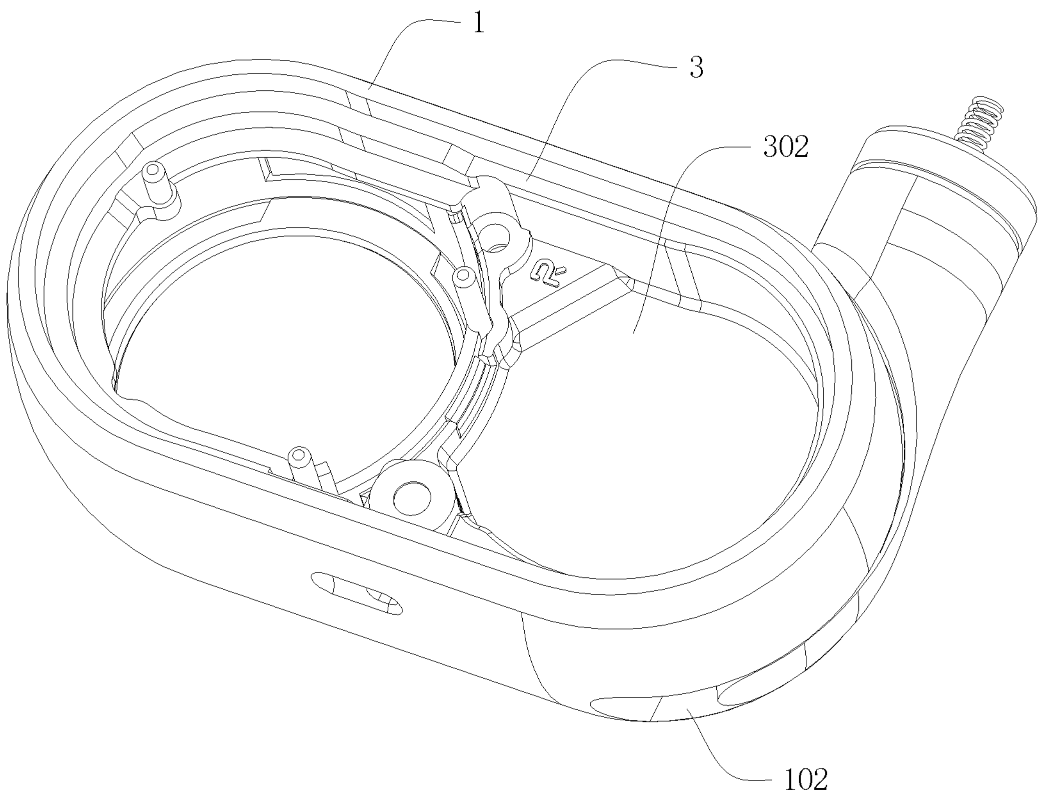
FIG. 5 is a schematic diagram of assembly of an isolation middle shell and a housing according to an embodiment.
Figure 6:
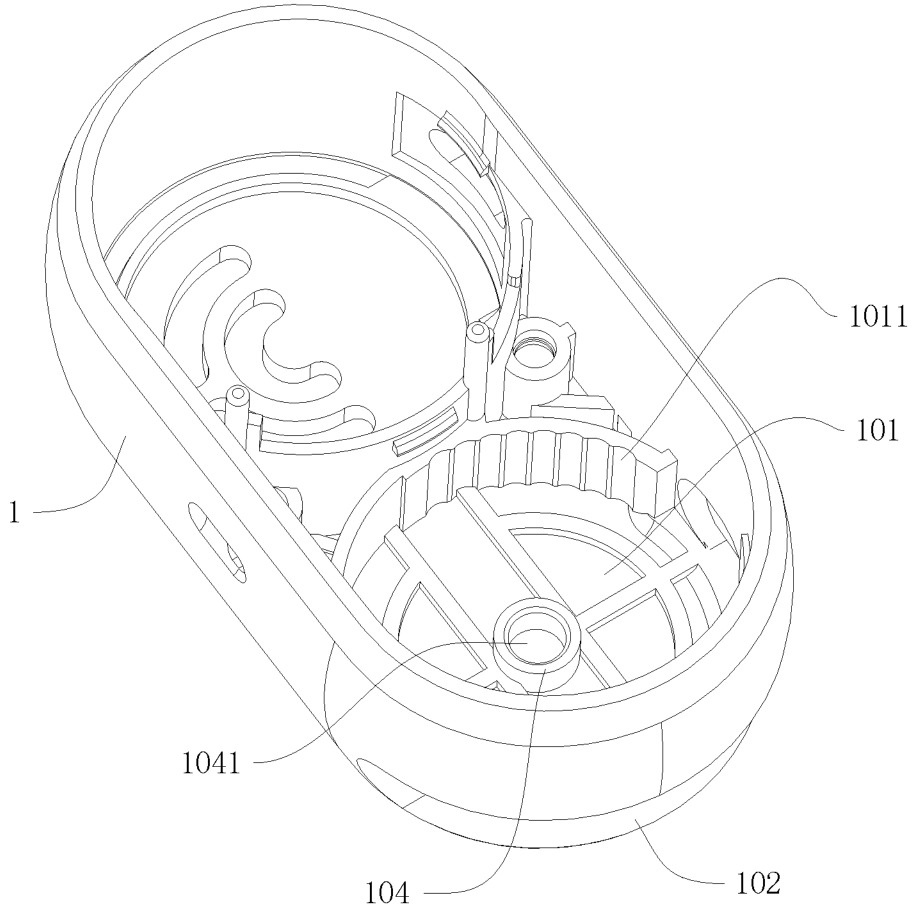
FIG. 6 is a schematic structural diagram of a housing according to an embodiment.
Figure 7:
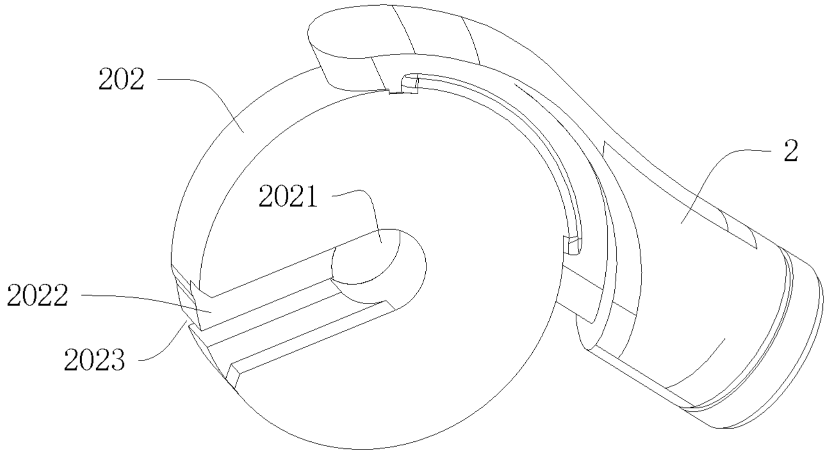
FIG. 7 is a schematic structural diagram of a rotating part according to an embodiment.
Figure 9:
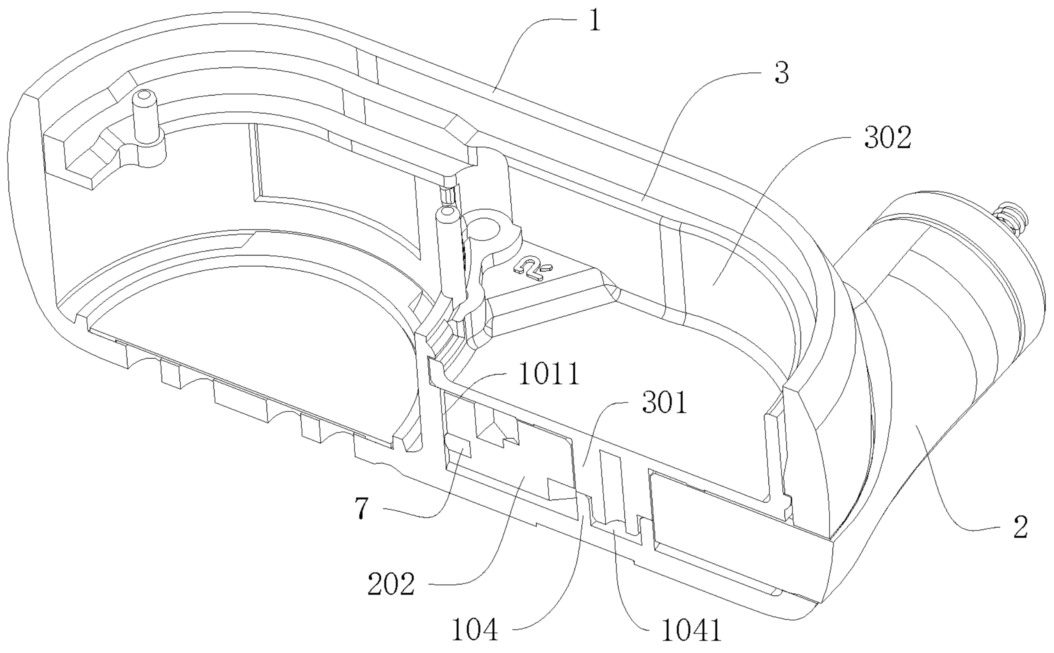
FIG. 9 is a schematic cross-sectional view of a housing and a rotating part according to an embodiment.

Referring to FIG. 6, the housing 1 provided with an accommodating groove 101 and an opening groove 102 connecting the accommodating groove 101 and the outside of the housing 1, and a first hole 1041 is formed in the groove bottom of the accommodating groove 101. Referring to FIG. 9, one end of the ear hanger 2 is provided with a rotating part 202 inserted into the accommodating groove 101 through the opening groove 102, and the intermediate position of the rotating part 202 is provided with a second hole 2021 aligned with the first hole 1041. Referring to FIG. 5 and FIG. 9, an isolation middle shell 3 is located in the housing 1 and a rotating shaft 301 is provided on the side near the rotating part 202, the rotating shaft 301 is inserted into the first hole 1041 through the second hole 2021, so that the housing 1 and the rotating part 202 rotate relatively around the rotating shaft 301. The end cap 6 is located on a side of the isolation middle shell 3 away from the rotating part 202 for covering the opening of the housing 1.

The earphones provided in this embodiment insert the rotating shaft 301 into the first hole 1041, so that when the housing 1 and the rotating part 202 rotate relatively around the rotating shaft 301, the rotating shaft 301 does not radially offset, so as to enhance the rotation feeling of the wearer when adjusting the position of the housing 1.

Figure 8:
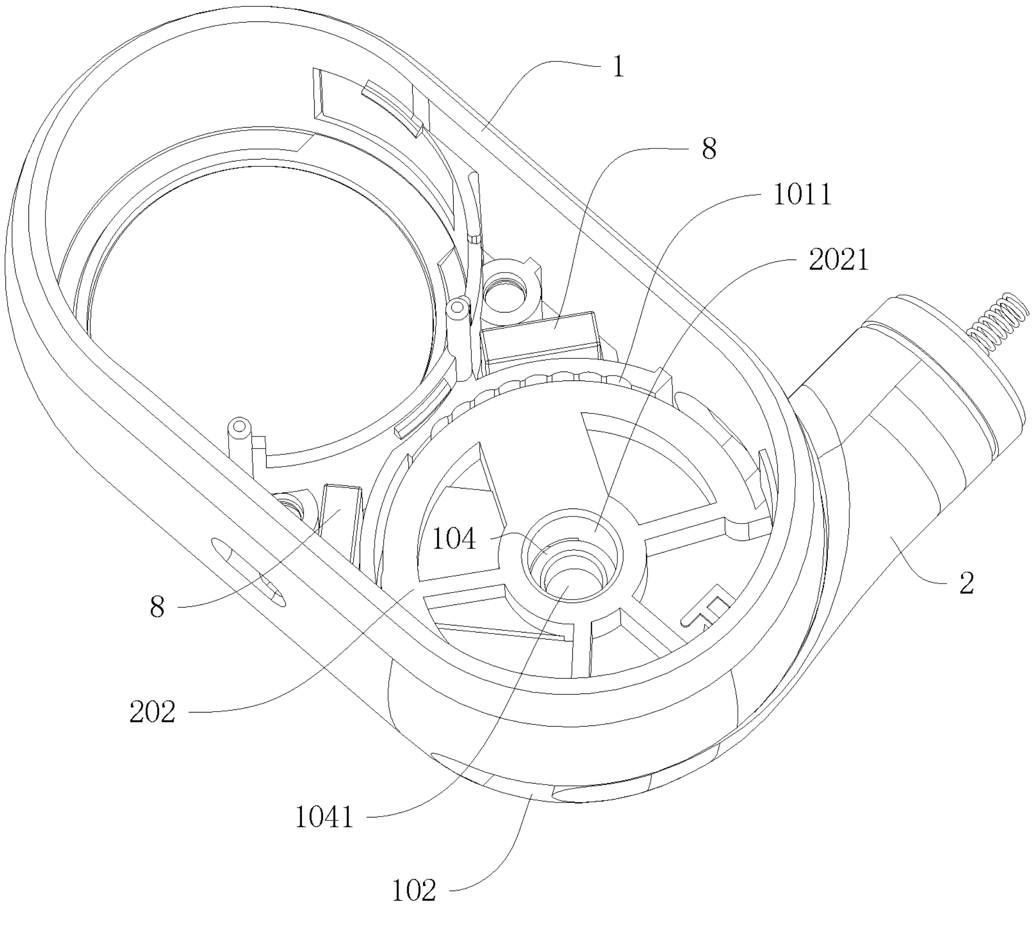
FIG. 8 is a schematic diagram of assembly of a housing and a rotating part according to an embodiment.

Optionally, referring to FIG. 8, a sensor 8 is disposed on a side of the isolation middle shell 3 away from the end cap 6. In this embodiment, the diameter of the rotating shaft 301 is small, so that the space in the housing 1 can be effectively reduced, it is convenient to arrange more sensors 8 and the like or to arrange larger capacity battery and the like.

Referring to FIG. 6 to FIG. 9, in this embodiment, the groove bottom of the accommodating groove 101 protrudes toward the rotating part 202 to form a positioning post 104, and the first hole 1041 is located at an end surface of the positioning post 104. The rotating part 202 is provided with an avoiding groove 2022 transversely inserted into the positioning post 104, and the avoiding groove 2022 extends from the edge position of the rotating part 202 to the second hole 2021 of the rotating part 202 in the radial direction of the rotating part 202.

When assembly is performed, the avoiding groove 2022 may be aligned with the positioning post 104, and then the rotating part 202 is pushed into the accommodating groove 101 transversely through the opening groove 102, when the positioning post 104 is aligned with the second hole 2021 of the rotating part 202, the hole wall of the second hole 2021 is abutted against the peripheral wall of the positioning post 104, so that the rotating part 202 cannot be continuously pushed along the radial direction (in this process, the positioning post 104 plays a role of assembling and positioning the rotating part 202). In this case, the isolation middle shell 3 is mounted in the housing 1, and because the shape of the isolation middle shell 3 is matched with the shape of the inner wall of the housing 1, after the isolation middle shell 3 is mounted, the rotating shaft 301 on the isolation middle shell 3 is automatically aligned with the second hole 2021 and inserted into the first hole 1041. Such a structural design is conducive to reducing the difficulty of aligning the second hole 2021 and the first hole 1041, thereby reducing the assembly difficulty and improving the production efficiency.

The storage groove 302 is provided on the side away from the rotating part 202 of the isolation middle shell 3, the storage groove 302 is provided with a circuit board 4 and an electronic device 5 electrically connected to the circuit board 4, for example, the electronic device 5 may be a battery and/or a vibrating film or the like. It should be understood that the isolation middle shell 3 may separate the rotating plate and the electronic device 5 such as the circuit board 4 etc. so as to avoid the interference of each electronic device 5 to the rotation of the rotating part 202 and affect the stability of the rotating part 202. In this embodiment, the isolation middle shell 3 and the rotating shaft 301 are of an integrated structure, so that the assembling step is omitted, and the production efficiency is improved. Certainly, in some other embodiments, the rotating shaft 301 can also be interpolated and connected to the isolation middle shell 3, and this utility does not limit the connection.

Figure 10:
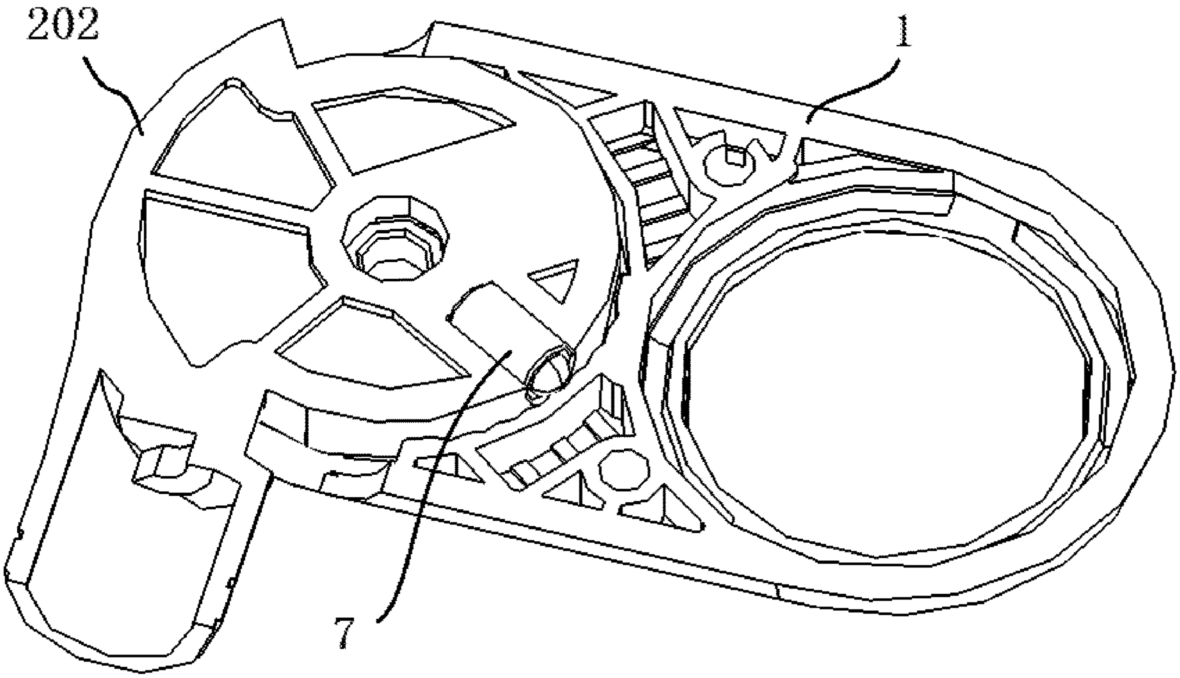
FIG. 10 is a schematic cross-sectional view of a housing and a rotating part according to an embodiment.
Figure 11:
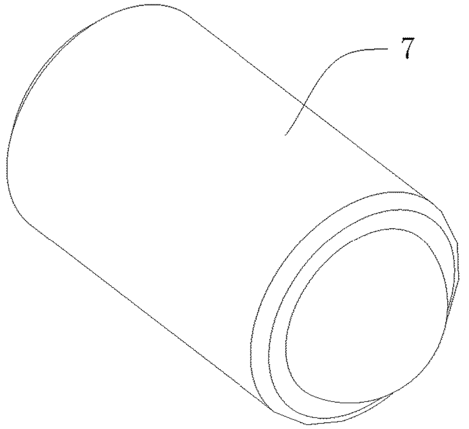
FIG. 11 is a structural schematic diagram of a glass bead spring according to an embodiment.

In this embodiment, a clamping assembly is provided between the housing 1 and the rotating part 202. Optionally, the clamping assembly includes an elastic member 7 and a plurality of positioning clamping grooves 1011. Each of the positioning clamping grooves 1011 is located on a groove wall of the accommodating groove 101; the elastic member 7 is mounted on the side wall of the rotating part 202 and configured to abut against the positioning clamping groove 1011. Optionally, referring to FIG. 11, the elastic member 7 includes a glass bead spring. Referring to FIG. 9 and FIG. 10, one end of the elastic member 7 is mounted on the rotating part 202, and the other end of the elastic member 7 is protruded to the outside of the circumferential surface of the rotating part 202, so as to abut against the positioning clamping groove 1011 when the rotating part 202 rotates.

It can be understood that, when the rotating part 202 rotates relative to the housing 1, the elastic member 7 may be clamped into the positioning clamping grooves 1011 in sequence, and after the angle adjustment is completed, since the elastic member 7 is clamped with the corresponding positioning clamping groove 1011, the relative rotation between the rotating part 202 and the housing 1 may be suppressed to a certain extent, thereby ensuring the relative stability between the rotating part 202 and the housing 1, and reducing the occurrence of the false deflection of the housing 1.

The groove depth of the avoiding groove 2022 is smaller than the thickness dimension of the rotating part 202. Optionally, the intermediate position of the avoiding groove 2022 is provided with a through groove 2023 penetrating through the groove bottom of the avoiding groove 2022, and the width of the through groove 2023 is smaller than the diameter of the rotating shaft 301, so as to avoid the rotating shaft 301 passing through the through groove 2023. The through groove 2023 extends from the second hole 2021 to the edge of the rotating part 202, such that the rotating part 202 generally presents a C-shaped shape.

Optionally, the rotating part 202 is made of ABS material. Specifically, the ABS plastic is a terpolymer of three monomers of acrylonitrile (A), butadiene (B) and styrene (S), and the relative amounts of the three monomers can be randomly changed to prepare various resins.

It can be understood that the C-shaped rotating part 202 formed by injection molding of the ABS material has a certain deformation capability, the rotating part 202 is deformed under the action of the radial pulling force during rotation, and the elastic hand feeling generated by the deformation can counteract the jamming feeling generated when the elastic member 7 rolls in the positioning clamping grooves 1011 to a certain extent, so that the rotating part 202 can be smoother when rotating, and the hand feeling fineness when rotating the housing 1 is improved.

Of course, in some other embodiments, the through groove 2023 may not be provided, which is not limited in this utility.

It should be noted that the through groove 2023 of the example is strip-shaped, and in some other embodiments, the through groove 2023 may also be other extended shapes, such as wavy, irregular physical shape, etc., and all of the above technical effects can be achieved as long as the rotating part 202 can produce faults.

Further, a preferred position set by the through groove 2023 is an intermediate position of the avoiding groove 2022, and the through groove 2023 is just located in the intermediate position of the avoiding groove 2022, which is beneficial to injection molding. In addition, the position (non-overlapping or partially overlapping) provided outside the avoiding groove 2022 of the rotating part 202 can also make the rotation smoother, and the through groove 2023 extends from the second hole 2021 to the edge to form a "fault".

In summary, compared with the prior art, the present embodiment includes the following advantages:

① the rotating shaft 301 is interpolated and connected to the first hole 1041 in the housing 1, so as to avoid the problem that the rotating shaft 301 is offset in the radial direction, thereby enhancing the hand feeling of the user;

② arranging the isolation middle shell 3 to separate the rotating part 202 from other parts, so as to avoid interference caused by other parts to the rotating part 202;

③ arranging the positioning post 104 and the avoiding groove 2022 to realize the alignment and positioning of the first hole 1041 and the second hole 2021, so as to reduce the alignment difficulty and assembly difficulty, and improve the production efficiency;

④ the rotating part 202 is configured as a C-shaped structure, and the elastic hand feeling generated by the deformation of the rotating part 202 partially cancels the frustration hand feeling generated when the elastic member 7 rotates, and the hand feeling fineness when rotating the housing 1 is improved, and the user experience is improved.

It should be understood that although the present specification is described in terms of implementations, but not every implementation includes only one independent technical solution, this description of the specification is merely for the sake of clarity, and those skilled in the art should set the specification as a whole, and the technical solutions in the implementations may also be combined appropriately to form other implementations that can be understood by those skilled in the art.

The series of detailed descriptions listed above are merely specific descriptions of the feasible implementation manners of this utility, and they are not intended to limit the protection scope of this utility, and equivalent implementations or variations that do not depart from the spirit of this utility should be included within the protection scope of this utility.

What is claimed is:

1. An earphone, comprising:

a housing provided with an accommodating groove and an opening groove, wherein:

the opening groove connects the accommodating groove and the outside of the housing; and a first hole is formed in the groove bottom of the accommodating groove; and an ear hanger, wherein:

one end of the ear hanger is provided with a rotating part inserted into the accommodating groove through the opening groove;

the rotating part is provided with a second hole;

a rotating shaft passes through the second hole and inserted into the first hole; and the housing and the rotating part are rotatably connected around the rotating shaft.

2. The earphone according to claim 1, wherein:

the groove bottom of the accommodating groove protrudes with a positioning post toward the rotating part; and the rotating part is provided with an avoiding groove inserted transversely to avoid the positioning post, and the avoiding groove extends from the edge position of the rotating part to the second hole of the rotating part in the radial direction of the rotating part.

3. The earphone according to claim 2, wherein:

an isolation middle shell is arranged on a side of the rotating part away from the positioning post; and a storage groove is provided on a side of the isolation middle shell away from the rotating part.

4. The earphone according to claim 3, wherein the isolation middle shell and the rotating shaft are of an integrated structure.

5. The earphone according to claim 2, wherein a groove depth of the avoiding groove is smaller than a thickness dimension of the rotating part.

6. The earphone according to claim 5, wherein:

a through groove penetrating through the groove bottom of the avoiding groove is formed in the intermediate position of the avoiding groove; and the through groove extends from the second hole to an edge.

7. The earphone according to claim 5, wherein:

the rotating part further comprises a through groove extending from the second hole to the edge, and the through groove and the avoiding groove at least partially do not overlap.

8. The earphone according to claim 2, wherein a clamping assembly is provided between the housing and the rotating part.

9. The earphone according to claim 8, wherein:

the clamping assembly comprises an elastic member and a plurality of positioning clamping grooves;

each positioning clamping groove is located in a groove wall of the accommodating groove; and the elastic member is mounted on the side wall of the rotating part and is used for abutting against the positioning clamping groove.

10. The earphone according to claim 9, wherein the elastic member comprises a glass bead spring.

* * * * *